US007703343B1

(12) United States Patent
Rodgers

(10) Patent No.: US 7,703,343 B1
(45) Date of Patent: *Apr. 27, 2010

(54) APPARATUS FOR TAKING MEASUREMENTS IN ACCESS MANHOLES

(76) Inventor: Matthew E. Rodgers, 1041 Santa Barbara Ct., Sacramento, CA (US) 95816

( * ) Notice: Subject to any disclaimer, the term of this patent is extended or adjusted under 35 U.S.C. 154(b) by 0 days.

This patent is subject to a terminal disclaimer.

(21) Appl. No.: 12/011,798

(22) Filed: Jan. 29, 2008

Related U.S. Application Data

(63) Continuation-in-part of application No. 11/026,381, filed on Dec. 30, 2004, now Pat. No. 7,322,252.

(51) Int. Cl.
*G01L 3/00* (2006.01)
(52) U.S. Cl. .................................. 73/862.08
(58) Field of Classification Search .............. 73/862.08
See application file for complete search history.

(56) References Cited

U.S. PATENT DOCUMENTS

| 2,950,900 | A | 8/1960 | Wynes |
| 3,143,170 | A | 8/1964 | Nelson |
| 3,588,255 | A | 6/1971 | Alexander |
| 3,995,373 | A | 12/1976 | Brumbelow |
| 4,462,166 | A | 7/1984 | Furlong |
| 4,536,960 | A | 8/1985 | Muti |
| 4,744,151 | A | 5/1988 | Wisniewski |
| 4,941,643 | A | 7/1990 | Ditcher |
| 4,982,505 | A | 1/1991 | Pocci |
| 5,309,644 | A | 5/1994 | Robinson et al. |
| 5,437,830 | A | 8/1995 | Calandra |
| 5,816,293 | A * | 10/1998 | Kiest, Jr. ..................... 138/98 |
| 6,425,186 | B1 | 7/2002 | Oliver |
| 6,920,394 | B2 | 7/2005 | Johnson |
| 7,000,328 | B1 | 2/2006 | Iliff |
| 2003/0226272 | A1 | 12/2003 | Finefield |
| 2005/0005467 | A1 | 1/2005 | Hannel |

* cited by examiner

*Primary Examiner*—Lisa M Caputo
*Assistant Examiner*—Octavia Davis
(74) *Attorney, Agent, or Firm*—Todd N. Hathaway

(57) ABSTRACT

An apparatus for measuring three-dimensional spatial locations of pipes and other features in manholes and similar structures. A laser distance meter or other electronic distance measuring device is supported centrally in the manhole opening by a pivot assembly that permits the device to both rotate in the horizontal plane and pivot in the vertical plane. Electronic angle sensors record the distance and orientation of the laser distance meter at each measurement point, from which the three-dimensional spatial location of the pipe or other feature is then calculated.

16 Claims, 16 Drawing Sheets

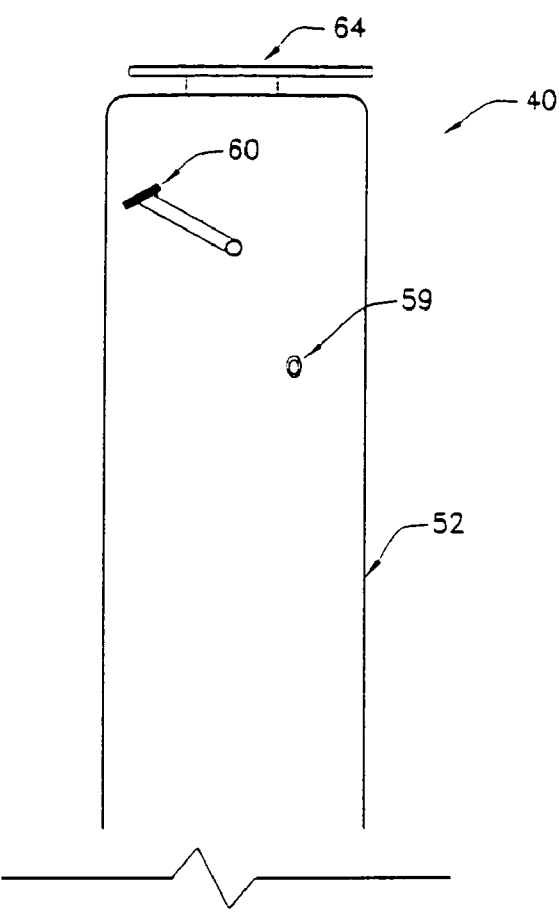
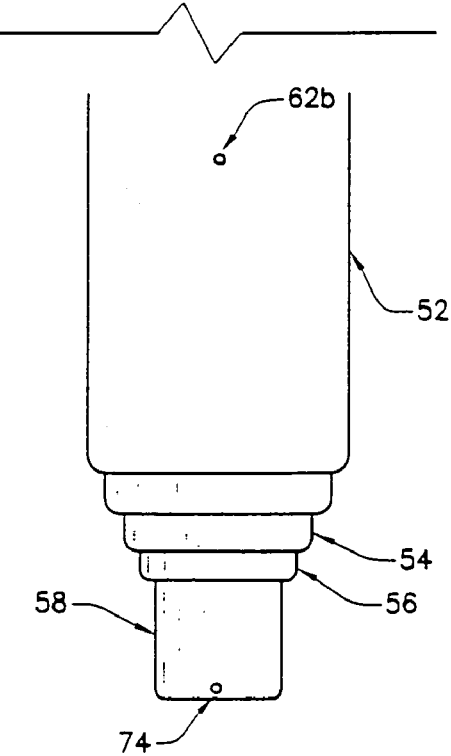
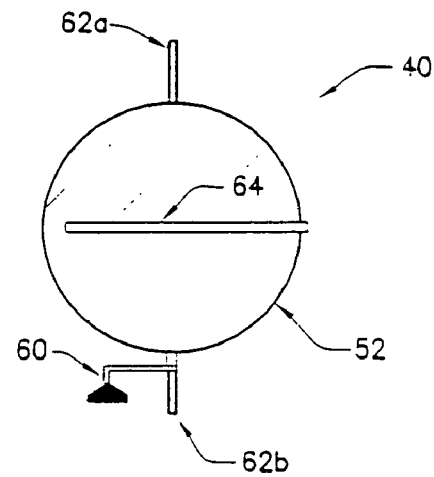
Fig. 5B
Fig. 5A

APPARATUS FOR TAKING MEASUREMENTS IN ACCESS MANHOLES

RELATED CASES CONTINUING INFORMATION

This is a continuation-in-part application of pending patent application Ser. No. 11/026,381, entitled "Apparatus for Taking Measurements in Access Manholes", which was filed Dec. 30, 2004 now U.S. Pat. No. 7,322,252.

BACKGROUND a. Field of the Invention

The present invention relates generally to surveying instruments for taking measurements in utility manholes, and, more particularly, to an apparatus for taking measurements of pipe openings and other features within a manhole using a rotating rod that is mounted centrally within the opening of the manhole for obtaining measurements of the height and horizontal position of the features.

b. Related Art

Certain utility systems, such as sewer systems, employ a multiplicity of conduits that pass beneath streets and built-up areas and that meet and are accessed at manholes at suitable locations. In the case of sewer systems, the bottom inside elevation of pipes, where they enter and leave the manholes, are referred to as "inverts".

For a variety of reasons, it is essential that the municipality or another utility owner/operator have accurate data concerning the location and orientation of the various pipes and/or other features in each manhole within its system. For example, it is critical to know the height and angular orientation of each pipe in a system when planning connections to existing sewers or other renovation work. In many or most cases however, such data is not readily available. For example, in many older municipalities the inverts have been installed successively over a period of decades (or even centuries), often in an almost haphazard fashion and with little or no record being kept concerning their location or orientation. Even in comparatively modern systems, record-keeping and measurement data are often scanty or non-existent.

To address these issues, many municipalities and other utility owners have undertaken comprehensive mapping of their sewers and other systems, including measuring the height and estimating horizontal orientation of all of the pipes that are accessible at the manholes. Since even a modest-sized municipality can have systems with literally thousands of pipes, inverts and so on, the scale of the mapping projects is massive, reaching extreme proportions in the case of major metropolitan areas. Moreover, the measurements must be precise, or else the collected data is useless.

The cost and difficulty of the mapping projects has been significantly compounded by the limitations of existing measuring equipment. On the whole, this has consisted of comparatively primitive, manually-operated surveying tools. FIGS. 1-2 show a typical arrangement, in which the measuring tool 10 is composed of a graduated rod 12 having a laterally-extending foot 14 mounted to its lower end. The rod is held by an operator 16 and the foot is inserted through the access opening 18 into the interior of the manhole 20, as is shown in FIG. 1. The operator guides the foot, visually and by feel, into the pipe openings 22, 24, as shown in FIG. 2. The operator then reads the height from the rod, where this meets the lip of the opening 18, and estimates the angular orientation of the pipe.

It will be readily understood that taking measurements in the foregoing manner is not only labor-intensive but is also fraught with opportunity for inaccuracies. It is difficult or impossible for the operator to simultaneously hold/manipulate the rod and record the measurements, so that frequently a two-man team is required and even then the process is slow and laborious. Also, the accuracy of the measurements is highly suspect: for example, the accuracy of the height measurement is dependent on the rod being held precisely upright and at the exact reference point on the manhole lid/seat (which frequently is not flat), which is especially difficult in the cases of large-diameter manholes and angled pipes. Furthermore, although certain expediencies have been adopted by some operators, judging the angular orientation of the pipes is a somewhat subjective art at best, to the point that measurements taken at a single manhole may vary significantly from one operator to the next. Still further, pipe out-of-roundness and manhole eccentricity cannot be effectively measured using this method. Even after the measurements have been obtained, the steps of sketching the manhole and transferring the typically handwritten measurements to an electronic database, which is essential for their subsequent use, is itself a laborious process and offers yet additional opportunities for mistakes and errors.

In combination, these factors present a serious problem for the entity that is conducting the mapping operation. The multiple steps and labor-intensive character of the process translate to a very high cost. Moreover, even when the mapping has been completed the accuracy of the data remains suspect, to the point where the utility owner often cannot rely on it and a second set of measurements must be taken before commencing a project, since the financial consequences of erroneous measurements can be catastrophic in a major project, such as the installation or renovation of a sewer line.

Accordingly, there exists a need for an apparatus for measuring both the elevation and angular orientation of pipe openings and other features in a manhole that obtains the measurements in a rapid and efficient manner. Furthermore, there exists a need for such an apparatus that renders it easy for only a single operator to both take and record the measurements. Still further, there exists a need for such an apparatus that is capable of obtaining the height and horizontal orientation measurements of the features with a high degree of accuracy. Still further, there exists a need for such an apparatus that is capable of collecting the measurement data in electronic form, so as to eliminate the need for the intermediate step of translating written or other manually-entered information to an electronic database.

SUMMARY OF THE INVENTION

The present invention has solved the problems cited above.

Broadly, there is an apparatus for obtaining measurements in a manhole, the apparatus comprising (a) an electronic distance measuring device; (b) a frame for supporting the electronic distance measuring device centrally in an access opening of the manhole; (c) the electronic distance measuring device being supported in the frame for obtaining a measurement of the distance from the electronic measuring device to a selected object in the manhole; (d) means operatively connected to the electronic distance measuring device for obtaining a measurement of the angle in a vertical plane from the electronic distance measuring device to the selected object; and (e) means operatively connected to the electronic distance measuring device for obtaining a measurement of the angle in a horizontal plane from the electronic distance measuring device to the selected object. The electronic distance measuring device may comprise a laser distance meter.

The means operatively connected to the laser distance meter for obtaining measurement of the angle in a horizontal plane may comprise a bearing interconnecting the laser distance meter and the frame so as to permit rotation of the laser distance meter in the horizontal plane, and means for determining an angular position of the laser distance meter in the horizontal plane. The means operatively connected to the laser distance meter for obtaining the measurement of the angle in the vertical plane may comprise a bearing interconnecting the laser distance meter and the frame so as to permit pivoting movement of the laser distance meter in the vertical plane, and means for determining an angular position of the laser distance meter in the vertical plane.

The invention further provides an apparatus for obtaining measurements in a manhole, comprising: (a) an electronic distance measuring device; (b) a bearing assembly mounted to the electronic distance measuring device so that the electronic distance measuring device is selectively rotatable in a horizontal plane and pivotable in a vertical plane; and (c) means for supporting the bearing assembly in an access opening of the manhole so that the electronic distance measuring device is located centrally therein; (d) so that the electronic distance measuring device can be rotated and pivoted to selected measurement points within the manhole. The electronic distance measuring device may comprise a laser distance meter.

The apparatus may further comprise a means for determining an angular position of the laser distance meter when the laser distance meter is directed at a measurement point in the manhole, so that a location of the measurement point can be calculated from the angular orientation and the distance determined by the laser distance meter. The means for determining an angular orientation of the laser distance meter may comprise at least one angle sensor mounted to the bearing assembly and operatively coupled to the laser distance meter so as to determine an angular orientation thereof relative to the bearing assembly. The at least one angle sensor may comprise a first angle sensor operatively connected to a horizontal axis pivot portion of the bearing assembly for determining an angular orientation of the laser distance meter in a vertical plane, and a second angle sensor operatively coupled to a vertical axis pivot portion of the bearing assembly for determining an angular orientation of the laser distance meter in a horizontal plane.

The bearing assembly may comprise an outer support for being supported from the manhole opening, an inner support in engagement with the outer support for rotation in a horizontal plane, the inner support having a central opening with the laser distance meter passing generally vertically therethrough, and a horizontal axle supporting the laser distance meter from the inner support for pivoting in a vertical plane. The apparatus may further comprise a plurality of legs mounted to the outer support for supporting the bearing assembly centrally in the opening of a manhole; the inner support may comprise an inner ring having the central opening, and the outer support may comprise an outer ring having the legs mounted thereto.

The invention further provides an apparatus for obtaining measurements in a manhole, comprising: (a) an electronic distance measuring device; (b) means for supporting the electronic distance measuring device so that the device is selectively rotatable in a horizontal plane and pivotable in a vertical plane so as to be directed towards selected measurement points within the manhole, and (c) means for recording, when the electronic distance measuring device is directed towards a selected measurement point, (i) a distance from the electronic distance measuring device to the selected measurement point, (ii) an angular orientation of the electronic distance measurement device in the horizontal plane, and (iii) an angular orientation of the electronic distance measuring device in the vertical plane, so that a location an angular orientation of the selected measurement point may be calculated therefrom. The electronic distance measuring device may comprise a laser distance meter.

The invention further provides a method for obtaining measurements in a manhole, comprising the steps of: (a) mounting a frame in an access opening of the manhole; (b) supporting an electronic distance measuring device in the frame centrally within the access opening; (c) obtaining a measurement of the distance from the electronic distance measuring device to a selected object in the manhole; (d) obtaining a measurement of the angle in a vertical plane from the electronic distance measuring device to the selected object; and (e) obtaining a measurement of the angle in a horizontal plane from the electronic distance measuring device to the selected object. The electronic distance measuring device may be a laser distance meter.

These and other features and advantages of the present invention will be more fully appreciated from a reading of the following detailed description with reference to the accompanying drawings.

BRIEF DESCRIPTION OF THE DRAWINGS

FIGS. 5A-5B are, respectively, elevational and plan views of the telescoping rod member of the measurement apparatus of FIGS. 3-4;

DETAILED DESCRIPTION a. Overview

Figure 1:
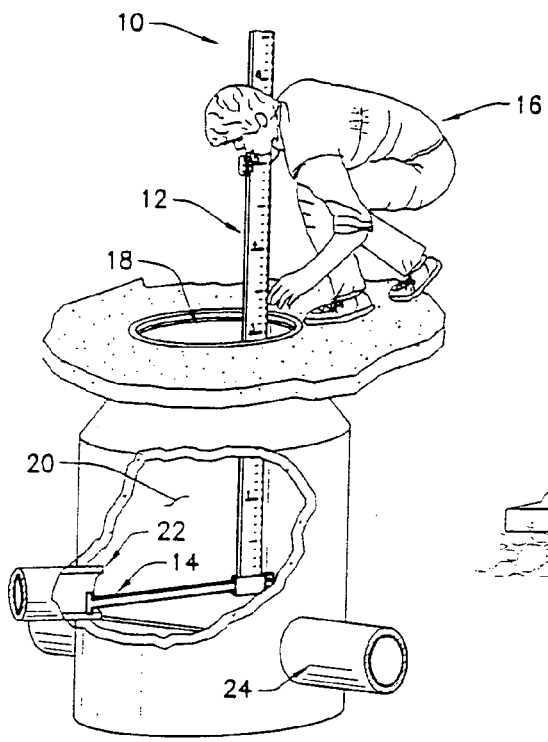
FIG. 1 is a perspective view of a measurement apparatus in accordance with the prior art, consisting of a graduated rod having an angled foot, showing the manner in which this is used by a worker to locate and measure pipes in a manhole.
Figure 2:
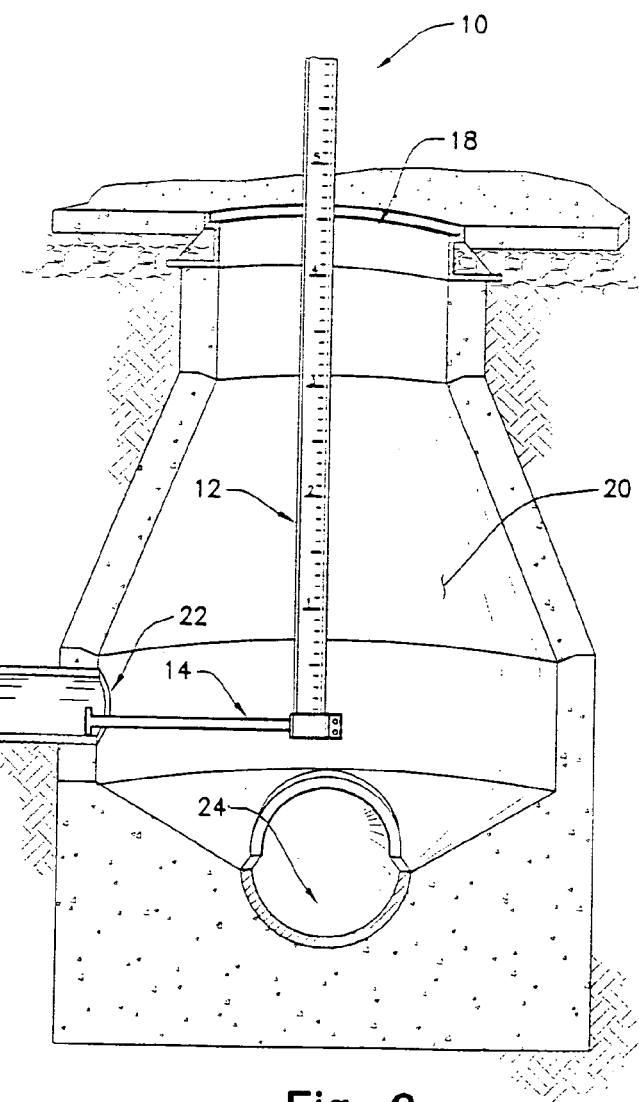
FIG. 2 is an elevational view of the prior art measurement tool of FIG. 1, with the manhole being shown in cross section, showing the manner in which the foot on the lower end of the measuring tool is inserted into the opening of a pipe so as to obtain measurements therefrom.
Figure 3:
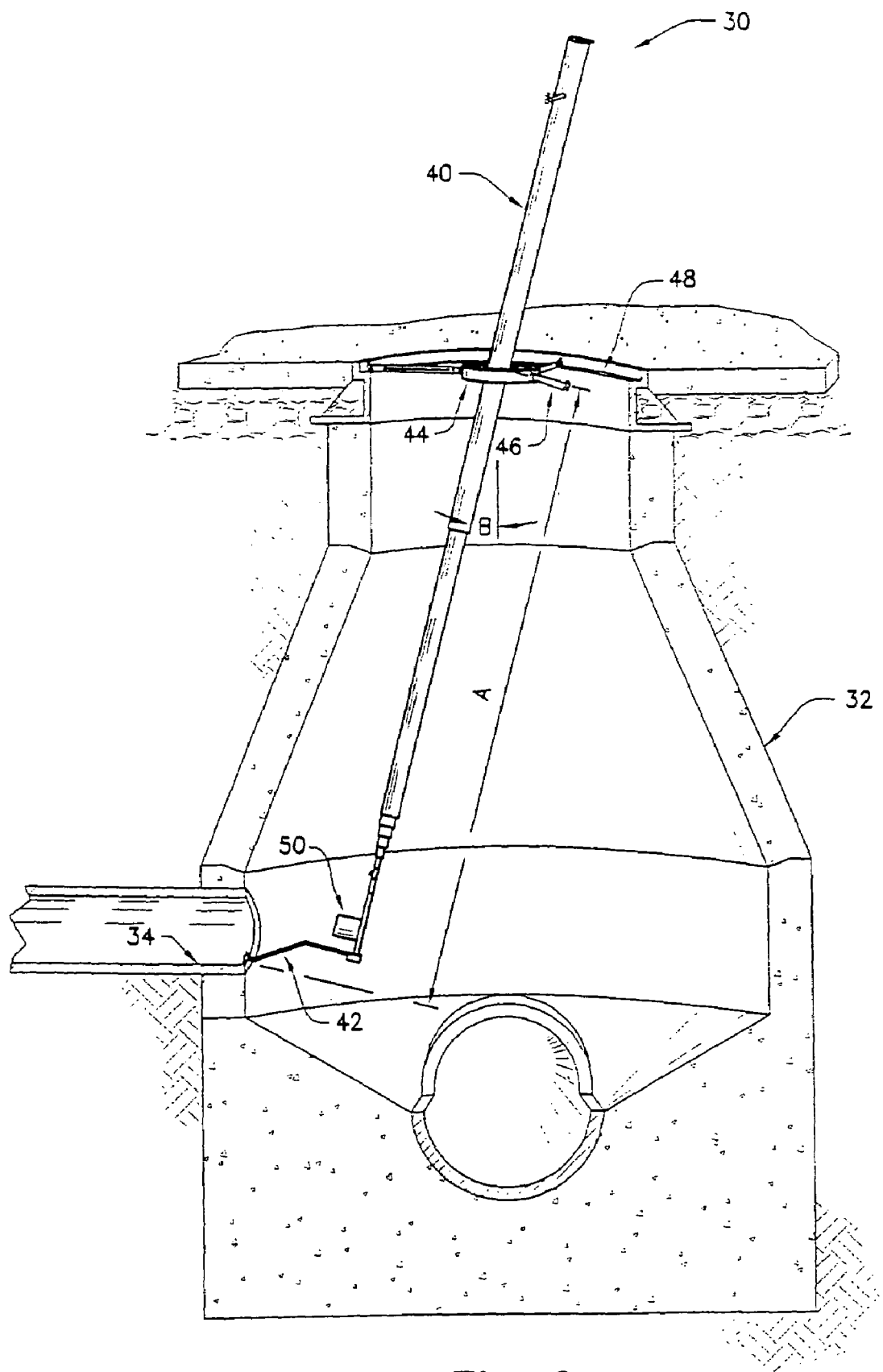
FIG. 3 is an elevational view of the measuring apparatus of the present invention, showing the manner in which the apparatus is installed in a manhole for obtaining measurements of pipes or other features or objects therein, the manhole being shown in cross section.

FIG. 3 shows a measurement apparatus 30 in accordance with a first embodiment of the present invention, installed in a manhole 32 so as to obtain measurements of a selected feature therein, in this case, a pipe 34 leading into the manhole. The manhole 32 that is shown in FIG. 1 has a generally conventional configuration, with a main channel formed in the base at the bottom of the cylindrical barrel, and a tapered cone leading upwardly through a narrowed chimney to the frame and lid at the opening; however, it will be understood that the manhole may be of any type having a suitable opening at its upper end.

As can be seen, the measurement apparatus 30 includes an elongate, telescoping rod member 40 having a foot member 42 mounted to its lower end. As will be described in greater detail below, the rod member is supported for both rotating and pivoting movement in a double-ring assembly 44, the latter being supported centrally in the manhole opening by a plurality of legs 46 that engage the manhole seat 48 at the opening. A camera and light 50 is optionally mounted to the lower end of the telescoping rod member, adjacent the foot member 42.

Figure 4:
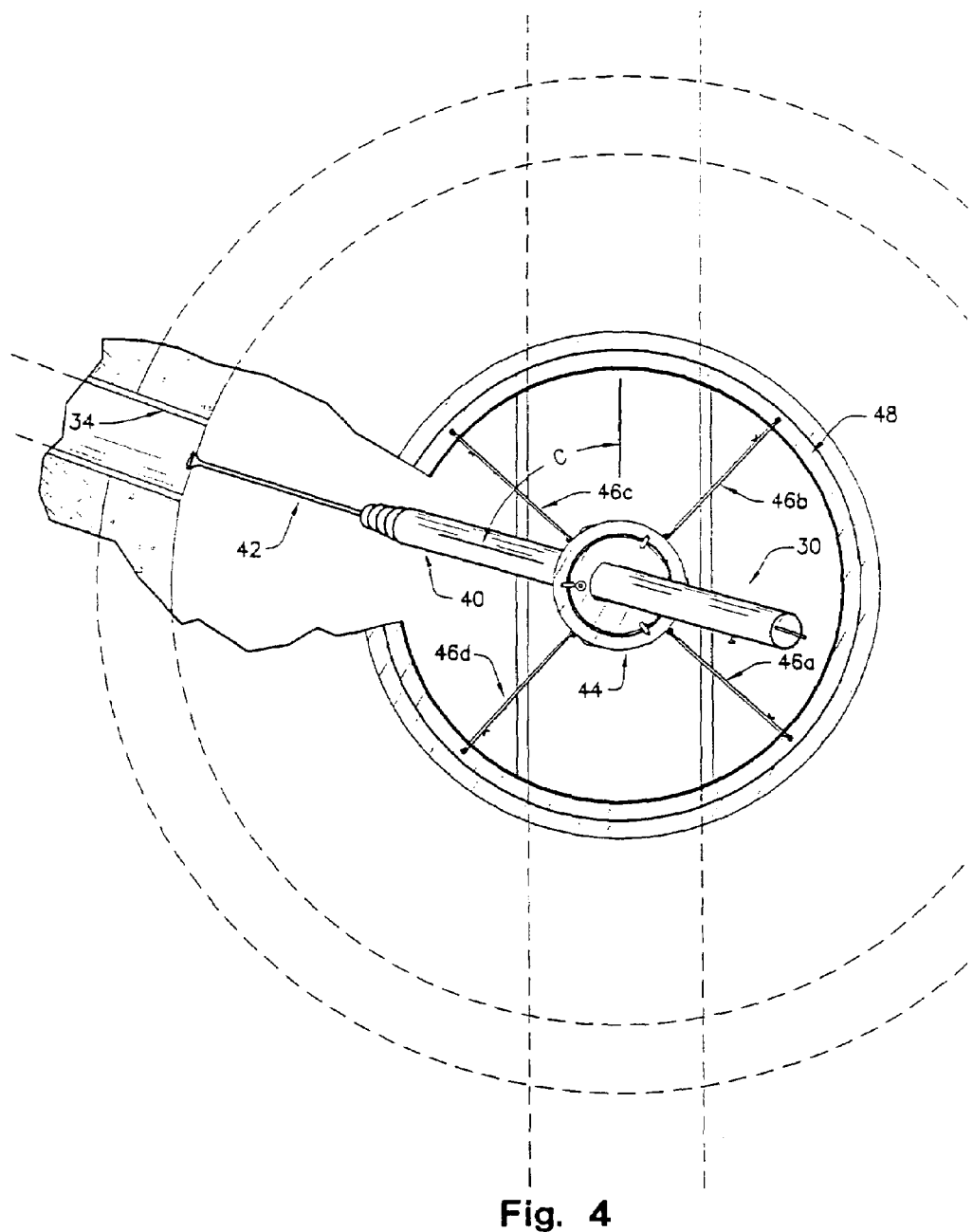
FIG. 4 is a top, plan view of the measurement apparatus and manhole of FIG. 3, showing the manner in which the centrally located rod member of the apparatus is rotated and pivoted to obtain accurate measurements to points in the manhole.

The telescoping feature of the rod member 40 enables its length "A" below the manhole opening to be adjusted for objects at different elevations. The rod member is mounted to the inner ring of the dual-ring assembly 44, on a horizontal pivot axis that permits the rod to be pivoted to an angle "B" relative to vertical. As is shown in FIG. 4, the inner ring is in turn supported on the outer ring for rotation about the vertical axis, so that the rod member can also be rotated to an angle "C" in the horizontal plane. In this manner, the rod member can be extended, pivoted and rotated so that the foot member 42 on its lower end can be aligned with the opening of the pipe (or other object) at any location in the manhole, as is shown in FIGS. 3-4.

b. Structure

As can be seen in FIGS. 5A-5B, the rod member 40 includes an elongate, tubular, primary housing 52 having a plurality of (e.g., three) progressively small-diameter sections 54, 56, 58 nested in a telescoping manner in its lower end. The terminal telescoping member is a smaller diameter rod member 58 that projects downwardly from the bottom of the assembly and provides a mounting area for attachment of the foot member 42, as will be described in greater detail below. The telescoping sections of the rod member are selectively extensible/retractable using a crank handle 60, which operates an internal cable and pulleys (not shown) or other suitable mechanism. The rod assembly is preferably constructed of a tubular material that is relatively light in weight and exhibits a high degree of rigidity and resistance to bending or twisting, such as tubular metal or fiberglass, so as to ensure the accuracy of the readings that are obtained therewith.

As can be seen in FIG. 5A and also FIG. 5B, a pair of pivot pins 62a, 62b are mounted on a common axis at about the lengthwise midpoint to about the bottom ⅓ of the main tube of the rod member. As will be described in greater detail below, the pivot pins are received in corresponding openings in the inner ring of the dual ring assembly to form the horizontal pivot axis for the assembly.

Also included is a sight 64 that is mounted across the upper end of the tubular housing 52, perpendicular to the axis of the pivot pins 62a, 62b, and which is used to set the horizontal reference angle (e.g., by pointing towards a known horizontal reference, such as the next downstream manhole).

Also included is a data port 59 for connecting to an external data collector or other external computer for storing, processing, and displaying data, preferably with an attachment for a cradle or other means for holding the external data collector (not shown).

Figure 6A:
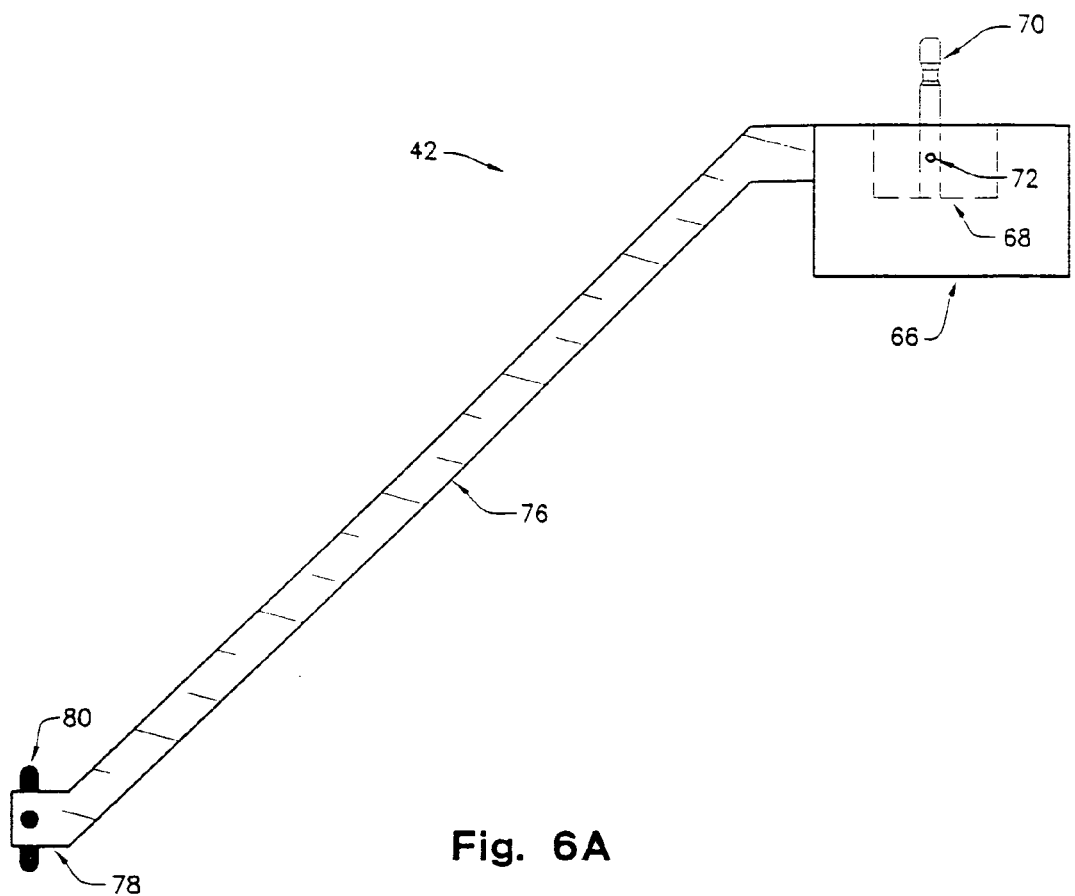
FIGS. 6A-6B are, respectively, elevational and plan views of the foot member of the measurement apparatus of FIGS. 3-4, the foot portion being mountable to the lower end of the rod member as seen in FIG. 3.
Figure 6B:
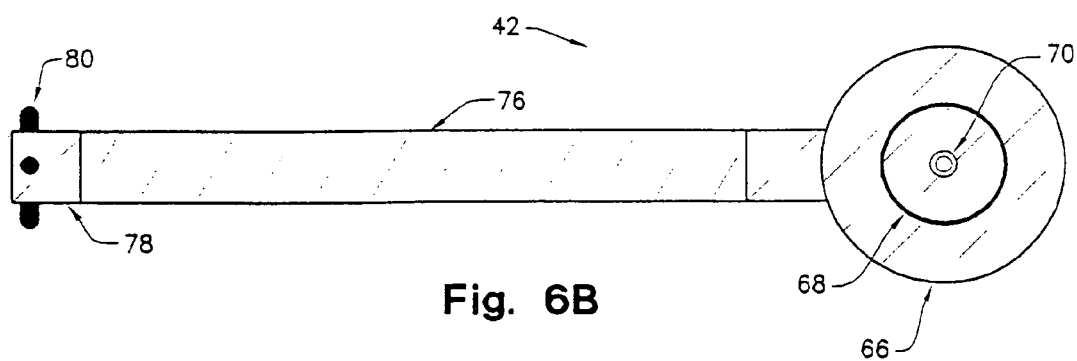

FIGS. 6A-6B, in turn, show the foot member 42 in greater detail. As can be seen, the foot member includes a base portion 66 having a mounting socket 68 for receiving the lower end of the extension rod 58 (see FIG. 5A), and a centering and electronic communications pin 70 that fits within and engages a corresponding socket (not shown) in the end of the rod. When thus assembled, a transverse pin (not shown) is passed through cooperating bores 72, 74 so as to lock the foot and rod members together.

An arm portion 76 extends horizontally from the mounting portion and then downwardly at an angle (e.g., 45°), before terminating in a short horizontal tip 78. The downwardly-angled configuration of the arm portion provides the advantage of allowing the tip portion 78 to reach into the openings of pipes near or at the bottom of the manhole without the lower end of the rod striking bottom in a manner that would interfere with taking the measurement. An upwardly-angled foot may also be used to assist with measuring shallow pipes, or a longer, straighter foot for measuring in wide manholes.

When taking an initial measurement the horizontal tip member may be centered within the bottom of the pipe, as shown in FIGS. 3-4. However, in many instances it is desirable to measure to the top and sides of the opening as well.

Although this can be done by "feel", the horizontal tip 78 of the foot member may advantageously be provided with an array of contact sensors 80 bounded on its top, bottom and sides for indicating to the operator when contact has been made with the corresponding portions of the opening. Additionally, sensors for flow, chemicals or other measurements may be attached.

FIGS. 7A-9B illustrate the components of the dual ring assembly 44 that supports the rod member for rotating and pivoting motion. As can be seen, this is made up of an inner ring 82 that fits within and is supported for rotation by an outer ring 84. Although the inner and outer supports are ring-shaped (i.e., circular) in the preferred embodiment, it will be understood that other shapes may be employed so long as the inner support is supported on the outer for rotation in a generally horizontal plane around a fixed axis.

Figure 7A:
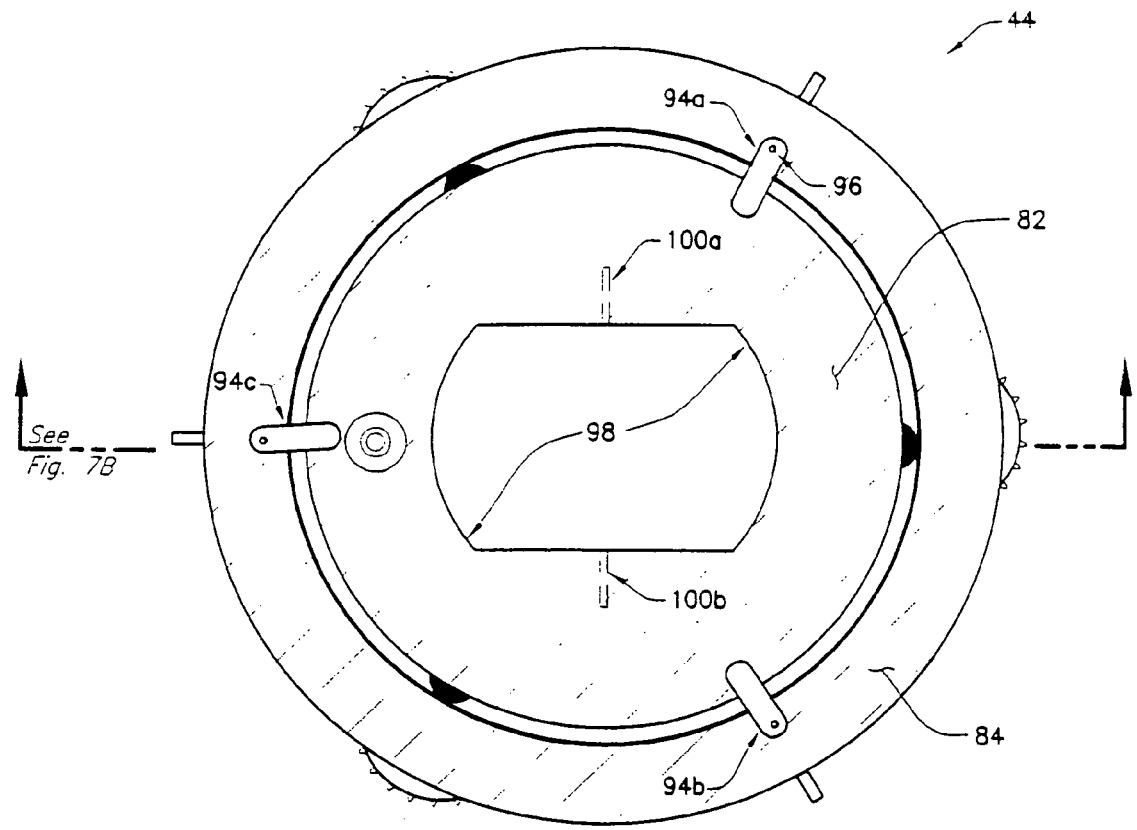
FIGS. 7A-7B are, respectively, plan and cross-sectional views of the dual-ring assembly of the measurement apparatus of FIGS. 3-4, that supports the rod member of the apparatus for rotating and pivoting motion as seen in FIG. 4.
Figure 7B:
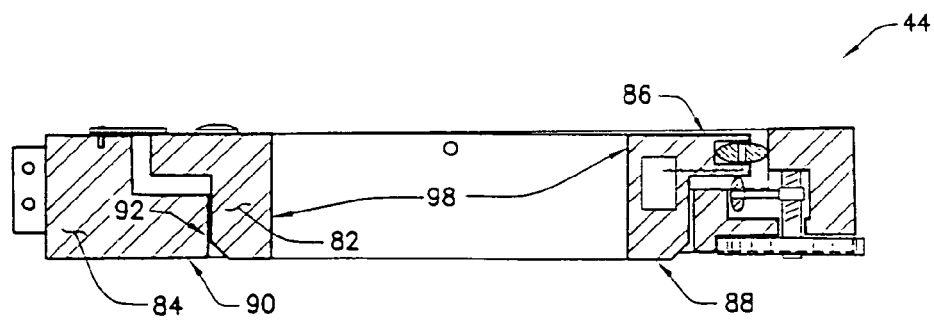

As can be seen in FIG. 7B, the inner ring 82 has an inverted hat shape, with a circumferential, outwardly extending flange portion 86 and a cylindrical, downwardly extending sleeve portion 88. The lower surface of the flange portion is supported by an inwardly-directed flange portion 90 of the outer ring member in sliding engagement therewith, while the sleeve portion 88 extends downwardly in close-fitting, sliding engagement with the main opening 92 of the outer ring member. Spring steel clips 94a-c are mounted to the upper surface of the outer ring and extend inwardly over the upper surface of the inner ring 82 so as to hold the inner and outer rings together when lifted; the clips are pivotably mounted to the outer ring by pins 96, so that the clips can be pivoted outwardly to permit removal of the inner ring for storage or maintenance. It will be understood that, in addition to clips, other mechanisms for maintaining the rings in rotating engagement may be utilized.

Figure 8A:
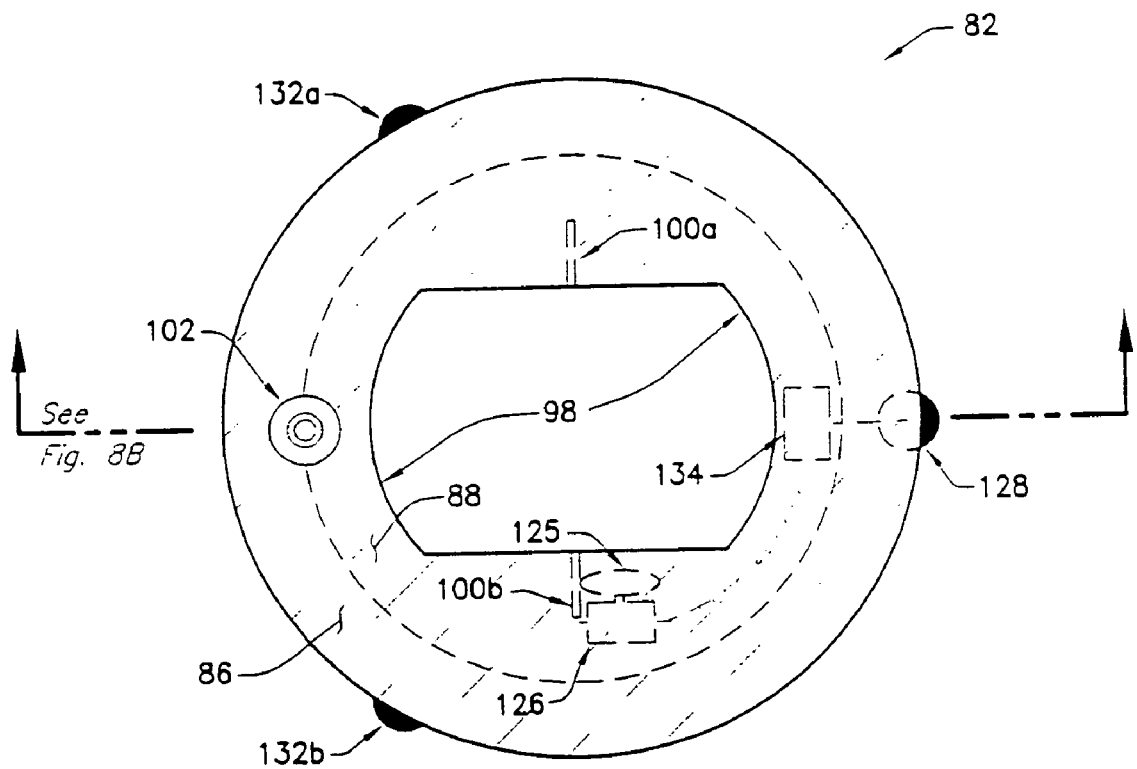
FIGS. 8A-8B are, respectively, plan and cross-sectional views of the inner ring of the dual-ring assembly of FIGS. 7A-7B, that pivotably supports the rod member of the apparatus and rotates within the outer ring of the assembly.

As can be seen in FIG. 7A and also in FIG. 8A, the inner ring includes a central opening 98 that is flanked by coaxially aligned channels 100a, 100b that receive the pivot pins 62a, 62b of the rod member so as to form the horizontal pivot axis, the opening 98 being elongated in the direction perpendicular to the axis in order to accommodate the pivoting motion of the rod (e.g., see FIG. 3). In addition, a fish-eye level 102 is mounted in the upper surface to aid when leveling the inner ring of the apparatus, as will be described in greater detail below.

As can be seen in FIGS. 9A-10B, the outer ring 84 is provided with peripheral, radially aligned mounting brackets 104a-c, that mate with corresponding mounting brackets 106 on each of the leg members 46, and which are attached thereto by means of bolts or other suitable fasteners. Thus mounted, the legs extend radially from the dual ring assembly to engage the rim of the manhole opening, as shown in FIG. 3.

Figure 10A:
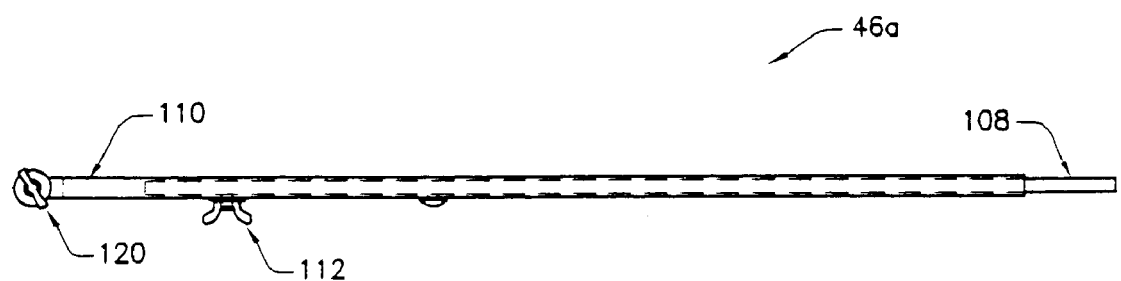
FIGS. 10A-10B are, respectively, plan and elevational views of one of the selectively extensible leg members of the apparatus that mount to the dual-ring assembly of FIGS. 7A-7B.
Figure 10B:
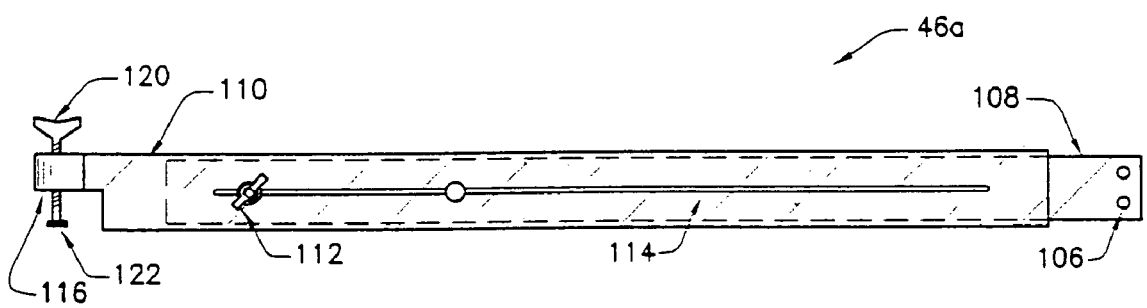

As can be seen in FIG. 10B, each of the leg members 46 has an inner bar portion 108 and an outer sleeve portion 110 that are in sliding engagement, so as to permit the length of the legs to be adjusted as necessary to accommodate openings of varying diameters. A thumbscrew 112 is threaded into the side of the inner bar partway along the length thereof, with the shaft of the thumbscrew extending through a longitudinal slot 114 in the outer sleeve. The outer sleeve can thus be slid over the bar until the desired length is achieved, at which point the thumbscrew 112 is tightened to lock the members together.

The outer end of each of the leg members is provided with an undercut projection 116 for resting on the seat for the manhole cover. A thumb-operated adjuster screw 120 extends vertically through the projection, with a foot 122 being rotatably mounted on its lower end. This enables the operator to adjust the legs and the ring assembly to a horizontal orientation, by simply adjusting the screws 120 up or down to visibly match the manhole lid survey location (the top of the legs being aligned with the rod pin joint). The level adjustment is then performed by means of finger-operated wheels 123a-c that are mounted about the perimeter of the outer ring 84, at positions intermediate the leg brackets 104a-c, and that raise and lower horizontal axis rollers 124a-c that are spaced about and raised slightly above the horizontal flange 90 of the outer ring; as this is done, a variable vertical gap between the horizontal flange 90 and the inner ring 82 allows the latter to tilt slightly within the outer ring until a level orientation is achieved.

The foregoing paragraphs describe an embodiment of the present invention in which the structure has the benefits of versatility, durability and ease of use. It will be understood, however, that other structures may be employed in other embodiments that are within the scope and spirit of the invention. For example, a gimball or ball-joint mechanism may be used in place of the dual-ring assembly described above. Similarly, the rod member may employ an articulated or sliding configuration rather than the telescoping mechanism described above. Similarly, other means for leveling or adjusting the length of the leg members may be employed.

c. Sensors

Figure 8B:
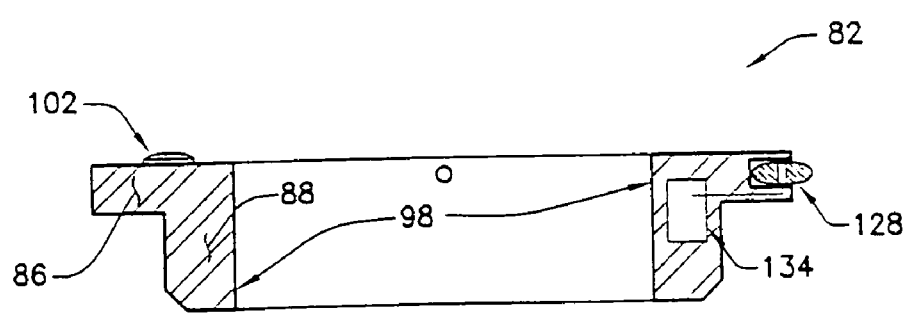

The apparatus of the present invention makes it possible to obtain measurements automatically, in electronic form, using sensors to determine the length and angular orientation of the rod member relative to the manhole opening. As can be seen in FIGS. 8A-8B, the inner ring 82 of the dual-ring assembly includes an internal wheel 125 that bears against the pivot pin 62b of the rod member when the latter is received in channel 100b. The wheel is operatively connected, via a horizontal axle, to an angle sensor 126 that provides a digital output based on rotation of the pivot pin and wheel. In this manner, the angle sensor 126 provides an output representative of the vertical angle of the rod member.

Figure 9A:
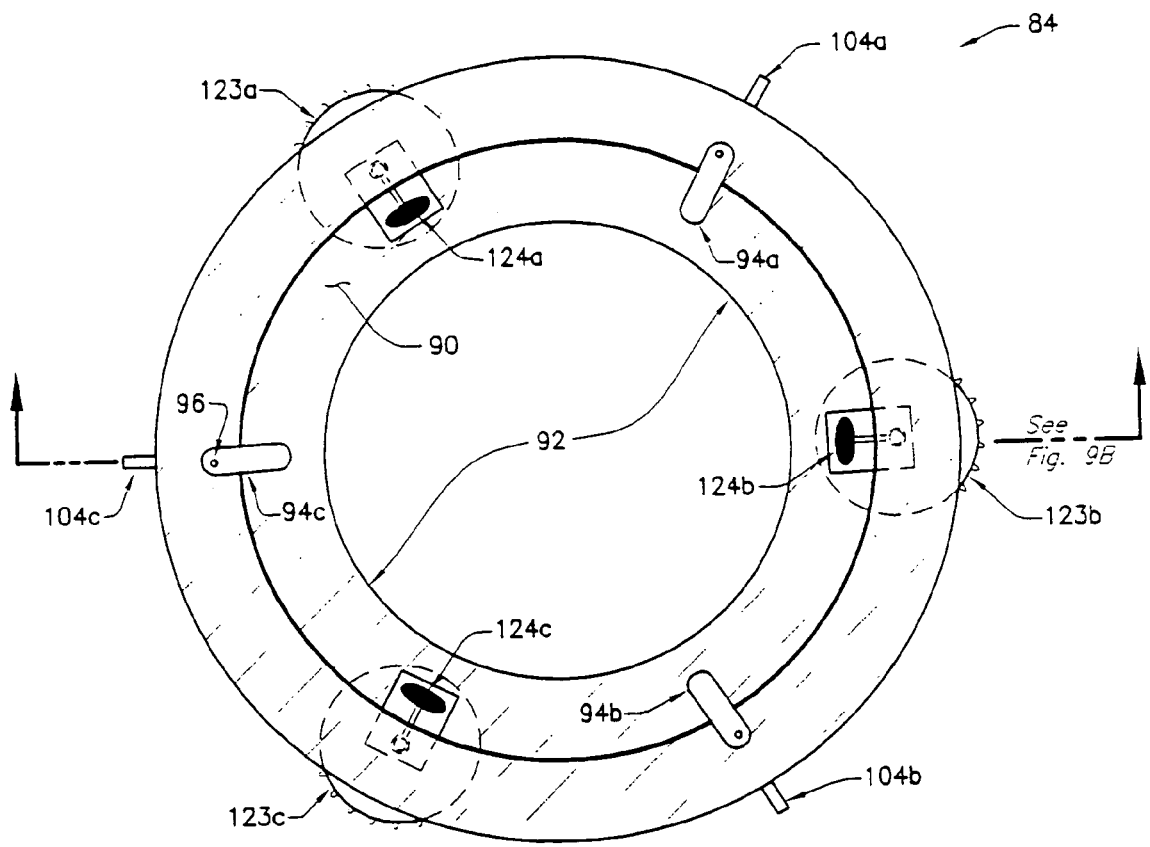
FIGS. 9A-9B are, respectively, plan and cross-sectional views of the outer ring of the dual-ring assembly of FIGS. 7A-7B, that rotatably supports the inner ring and that mounts the leg members of the apparatus which center the ring assembly in a manhole opening.
Figure 9B:
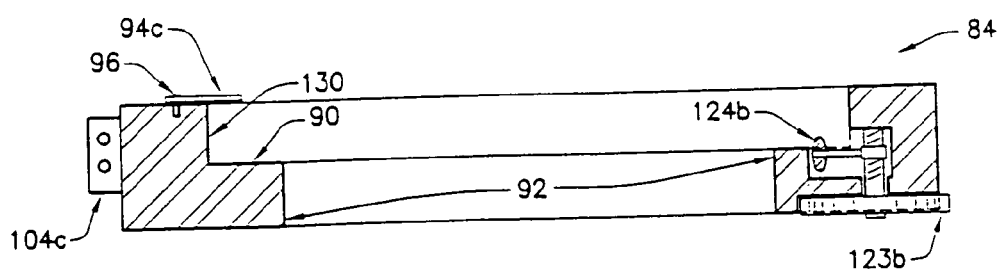

The horizontal angle (i.e., the angle in the horizontal plane), in turn, is determined by means of a second measurement wheel 128, which is mounted on a vertical axis and which protrudes outwardly from the perimeter of the inner ring so as to bear against the cylindrical inner surface 130 of the outer ring (see FIG. 9B). Additional, outwardly-biased (e.g., spring-tensioned) wheels 132a, 132b are mounted about the perimeter of the inner wheel member, generally equidistant from the sensor wheel 128, so as to maintain the latter in firm, balanced frictional engagement with the inner surface of the outer ring. The sensor wheel 128 is operatively connected to an angle sensor 134, which may suitably be the same sensor as the vertical angle sensor 126 described above, i.e., a combination angle sensor unit may be employed; alternatively, there may be separate angle sensor units for the vertical and horizontal measurements. The sensor wheel 128 and angle sensor unit 134 therefore provide a digital output representative of the horizontal angle of the rod member as it and the inner ring are rotated within the stationary outer ring 84. It will be understood that in some embodiments other mechanisms may be utilized to provide the rotational input to the angle sensors in place of the wheels 125, 128, such as gears that engage graduated teeth on the rotating pivoting members.

The third component of the measurement data is the length of the rod member, i.e., the length to which the foot member on its lower end has been extended. This is provided by a third angle sensor, operatively connected by a sensor wheel or other mechanism (not shown) to the axle of the hand crank 60 (see FIG. 5A) by which the length of the rod member is adjusted. The sensor therefore provides an output that corresponds to the number of turns by which the crank handle has been rotated, with the number of turns being calibrated to the change in length of the rod member; alternatively, the sensor may be driven by engagement with the cable that is adjusted by the crank handle rather than the crank handle itself.

Angle sensors providing digital outputs that are suitable for use in the present invention are available from Nobotechnik (155 Northboro Rd., Southborough, Mass.) and other suppliers. Moreover, in some embodiments linear rather than rotary position sensors may be employed. It will also be understood that position/angle sensors that provide analog rather than digital outputs may be employed in some embodiments of the invention, although use of digital-output devices greatly simplifies collection and processing of the information.

d. Setup and Use

The following are example steps illustrating setup and use of a preferred embodiment of the measurement apparatus of the present invention. The steps are arranged substantially in sequential order. However, it will be understood that in some instances, there may be additional or fewer steps and the steps may be practiced in different sequences.

1. Remove rod and attachments from case. Mount rod member to dual ring assembly and attach legs to outer ring.
2. Visually inspect manhole opening and note manhole lid elevation at center where surveyed, as compared with surrounding manhole lid seat; remove manhole lid.
3. Extend/Shorten leg members to fit manhole lid seat; tighten thumbscrew fittings to lock.
4. Insert foot and lower end of rod member into manhole, and rest leg members on inside of lid seat. Adjust elevation of legs using adjuster screws at ends, until elevation at the top of the legs is the same as the removed manhole lid.
5. Use level adjusters on outer ring of dual-ring assembly to adjust inner ring until fish-eye level appears centered.
6. Attach data collector to data port on rod using cable; energize data collector.
7. Perform calibrations and setting adjustments as necessary; generally, settings will need to be calibrated at regular intervals or changed when a different foot, extension, or other attachment is added to the lower end of the rod member which changes the vertical and horizontal reach.
8. Provide data collector with reference location from land survey (ordinarily approximate center of the subject manhole). Enter point to be used as a back sight, or horizontal angle reference, again from previous land survey; sight back sight point using the sight (64) atop the rod member to provide reference direction; if GPS is employed, the reference direction may be true north or other predetermined direction.
9. Move foot member on the lower end of rod member into the pipe opening or other selected point/object; data collector displays the rod length, vertical angle and horizontal angle. When one of sensor (80) on end of foot member contacts the opening, the data collector is activated and provides a reading indicating which side of the opening has been contacted. If excessive pressure has been exerted on the foot (possibly causing bending and an erroneous reading), or another reading outside the sensor range is reached, this too is displayed so that the operator can correct accordingly.
10. When the operator has determined that the foot is in contact with the point that is to be recorded (e.g., the bottom center of a pipe opening), the operator presses a button and the readings that appear on the data collector are recorded. A description or other comments may be provided in an optional, open text field.
11. Measurement points may be numbered automatically, with the reference survey point number being followed by a simple consecutive numbering system. For example, if a manhole survey point number is 302, then three points (e.g., three pipes) surveyed in that manhole may be 302-1, 302-2, 302-3.
12. The raw data—including the applicable foot sensor reading, rod length, horizontal angle, vertical angle and user description—is suitably recorded in a simple delimited text file based on each point number. The sensor reading may be the applicable contact sensor, or it may be a reading from a flow meter, chemical tester (e.g., H2S sensor) digital photo (from a camera on the foot), or any other data that may be recorded from a sensor mounted on the bottom of the rod or foot.
13. After measurements/raw data have been collected, turn off data collector and disconnect from rod member. The rod member and legs can then be collapsed and/or disassembled for transportation/storage.
14. Download data from data collector, together with data from land survey containing points for centers of manholes and back sights. Use software to calculate heights and orientations of pipes or other features; model manholes and output data in graphic and/or tabular formats.

e. Calculations

Using the embodiment of the invention that is shown in FIGS. 3-4, determination of the position and angular orientation of the measured pipes or other features is obtained from the position sensor data using the relationships set forth below. These calculations may be performed using a laptop computer or other conventional processor; it will be understood that it is within the ability of one or ordinary skill in the relevant art to write software required to implement the calculations and to store the results in a form suitable for subsequent retrieval and manipulation.

Figure 11:
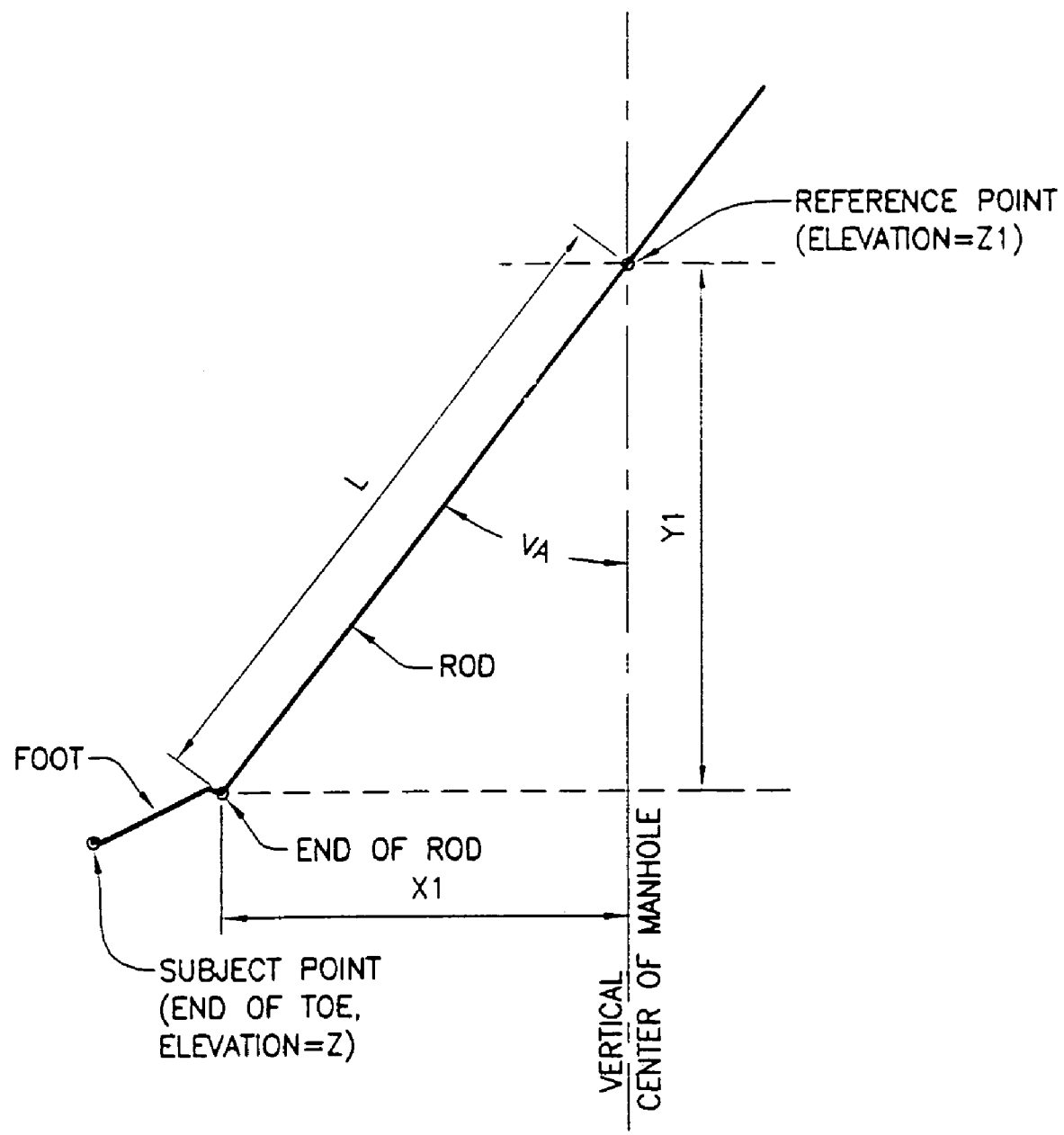
FIGS. 11, 12A-12B and 13 are schematic views of the rod, foot and toe members of the apparatus of FIGS. 3-4, showing these in elevational and plan view and illustrating the variable measurements that are taken by the apparatus and from which the location of the pipes or other features are calculated.
Figure 12A:
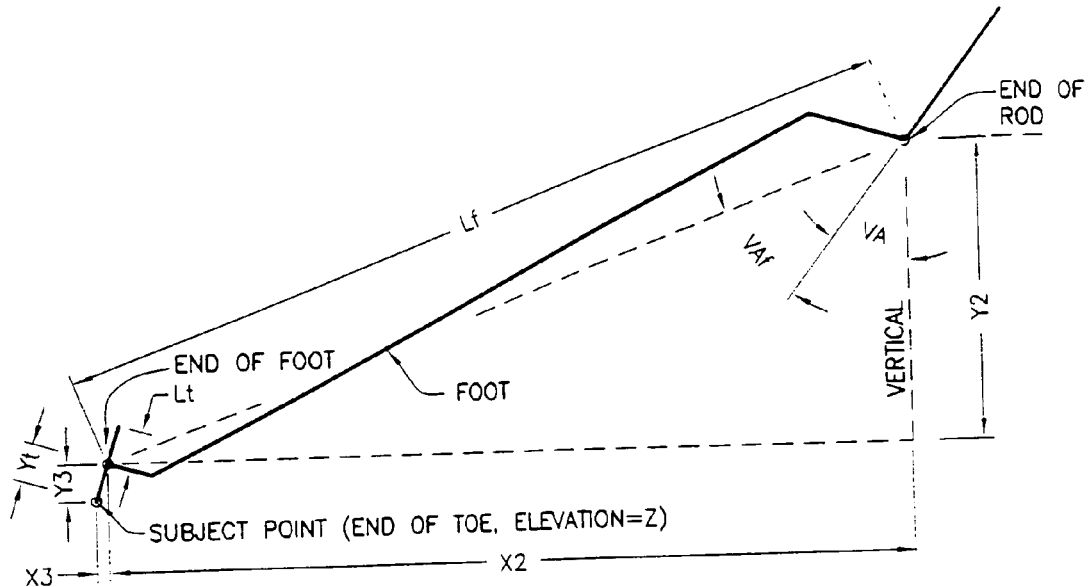
Figure 12B:
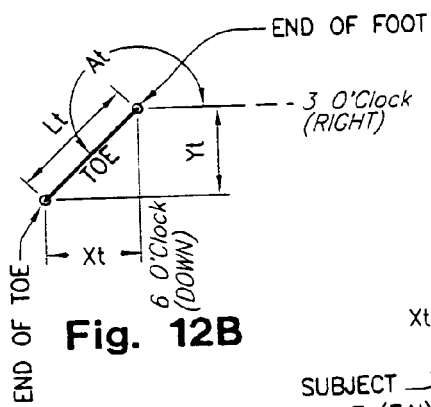
Figure 13:
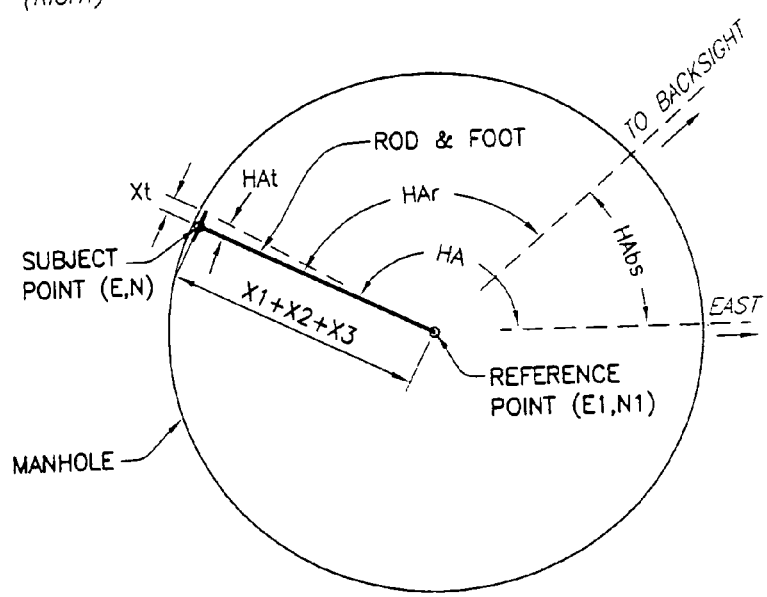

The following variables and calculations refer to the schematic views set forth in FIGS. 11-13.

TABLE 1

| VARIABLES | |
|---|---|
| At | Angle of toe making contact |
| E | Easting of subject point |
| E1 | Easting of reference point |
| HA | Horizontal angle of rod and foot |
| HAbs | Horizontal angel of back-sight |
| HAr | Reference horizontal angle (foot to back-sight) |
| L | Length of extended rod |
| Lf | Length of foot |
| Lt | Length of toe |
| N | Northing of subject point |
| N1 | Northing of reference point |
| VA | Vertical angle of rod |
| VAf | Vertical angle of foot |
| Y1 | Elevation change from rod |
| Y2 | Elevation change from foot |
| Y3 | Elevation change from toe |
| Yt | Vertical position of toe |
| X1 | Horizontal offset from rod |
| X2 | Horizontal offset from foot |
| X3 | Horizontal offset from toe |

TABLE 1-continued

VARIABLES

| | |
|---|---|
| Xt | Horizontal position of toe |
| Z | Elevation of subject point |
| Z1 | Elevation of reference point |

TABLE 2

ROD CALCULATIONS

| | |
|---|---|
| Y1 = | L × cos(VA) |
| X1 = | L × sin(VA) |

TABLE 3

FOOT CALCULATIONS

| | |
|---|---|
| Xt = | Lt × cos (At) |
| Yt = | Lt × sin (At) |
| X2 = | Lf × sin (VAf + VA) |
| Y2 = | Lf × cos (VAf + VA) |
| X3 = | −Yt × sin (VA) |
| Y3 = | −Yt × cos (VA) |
| X = | Z1 − Y1 − Y2 − Y3 |

NOTE: VA IS NEGATIVE FOR ROD SWINGING BACKWARDS (OPPOSITE OF THAT SHOWN)

TABLE 4

HORIZONTAL CALCULATIONS $$HAt = \arctan\frac{(Xt)}{X1 + X2 + X3}$$

HA = HAr + HAbs
N = N1 + (X1 + X2 + X3) × sin (HA − Hat)
E = E1 + (X1 + X2 + X3) × cos (HA + HAft)

The foregoing calculations assume that the rod remains essentially straight, i.e., there is an absence of significant bending. However, if the rod tends to bend or deflect downwardly (e.g., due to the weight of the foot or an attachment, or of the rod itself), a correction may be applied to the calculations, based on empirically determined values for radii of curvature and chord lengths produced by various lengths/vertical angles of the rod. Alternatively, such values may be calculated based on measurements taken on "real time" basis by sensors on the assembly itself.

f. Direct Horizontal Measurement

Figure 14:
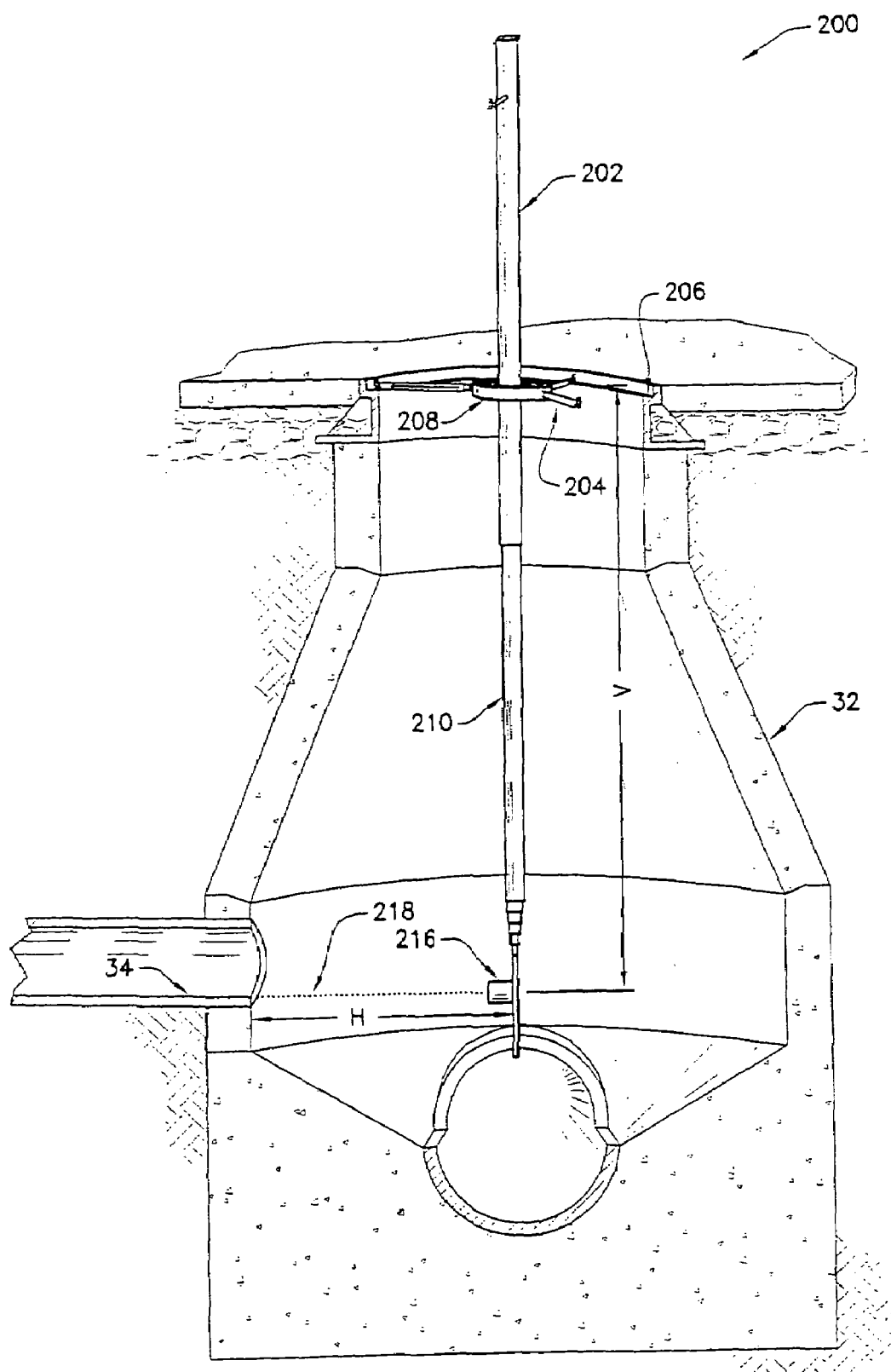
FIG. 14 is an elevational view, similar to FIG. 3, of a measuring apparatus in accordance with a second embodiment of the present invention, in which the rod rotates in the horizontal plane as with the embodiment shown in FIGS. 3-4, but in which the horizontal measurement is taken by a laser distance meter or other electronic measuring device rather than by pivoting the rod in the vertical plane.

FIG. 14 shows a measurement apparatus 200 in accordance with a second embodiment of the invention. The tool is shown installed in a manhole 32 to obtain measurements of an exemplary pipe 34, similar to that described above. However, by comparison to the embodiment that is shown in FIGS. 3-4, the tool that is shown in FIG. 14 obtains a direct measurement of the horizontal distance to the pipe or other feature, using a laser distance meter or other electronic distance measuring device rather than by pivoting the rod in the vertical plane.

Figure 15:
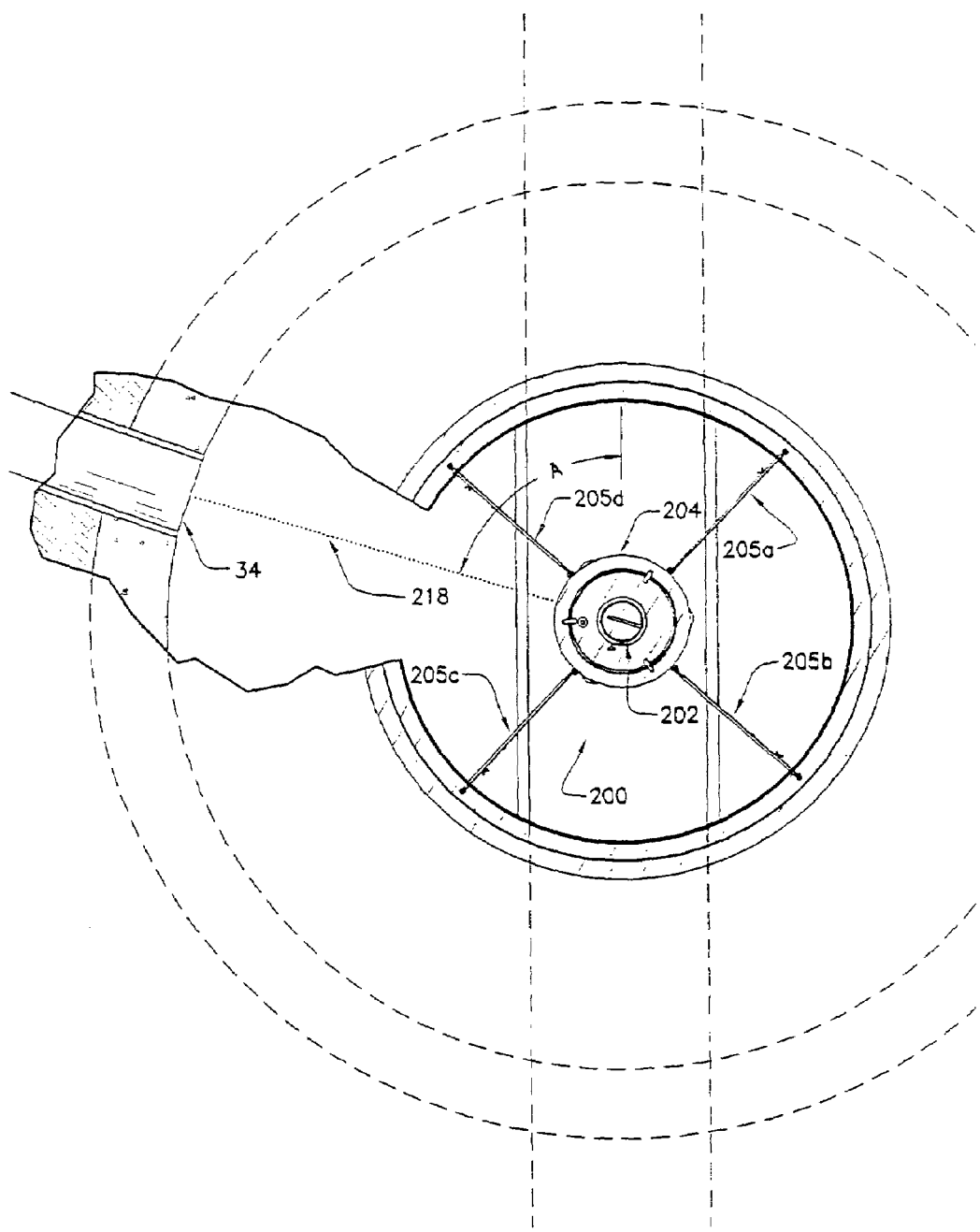
FIG. 15 is a top, plan view, similar to FIG. 4, showing the manner in which the measuring apparatus of FIG. 14 is supported and rotated in a manhole so as to take measurements of selected points or features therein.

Accordingly, as can be seen in FIG. 14, the measurement apparatus 200 includes an elongate, telescoping rod member 202 that is supported centrally the opening of the manhole 32 by a frame 204 that engages the manhole seat 206; as can be seen in FIG. 15, the frame includes a plurality of adjustable, radially extending legs 205a-d, substantially the same as described above. The rod member is supported in the frame in a bearing assembly 208 that allows the rod to be rotated in the horizontal plane, but unlike the bearing assembly described above, does not allow it to pivot in the vertical plane, i.e., the rod is maintained in a vertical orientation.

The lower end portion 210 of the rod member is selectively extensible (e.g., telescoping), in a manner similar to that described above. An electronic distance measuring device 216 is mounted to the lower portion of the rod member; in the illustrated embodiment, the electronic distance measuring device is preferably a laser distance meter, although it will be understood that other types of devices may be utilized; suitable laser distance meters are available from a large number of manufacturers/suppliers, such as, for example, Omron Electronics LLC (Schaumburg, Ill.). A camera may also be included to facilitate location of the target features.

Accordingly, the height of the selected object in the manhole (e.g., pipe 34) can be measured by extending/retracting and rotating the lower end portion 210 of the rod member until the electronic distance measuring device is level with and in angular alignment (in the horizontal plane) with the object, as indicated by a dotted line 218 in FIGS. 14 and 15. The height of the feature is then calculated from the vertical length "V" of the rod between the reference height at the frame 204 and the measuring device that is positioned level with the feature. The angular position in the horizontal plane, in turn, is determined from the angular displacement "A" of the line-of-sight 218 from the reference angle, as shown in FIG. 15 the angular position of the rod being determined using one or more angle sensors in substantially the same manner as described above. Finally, the distance "H" in the horizontal plane is measured by the laser distance meter or other electronic distance measuring device, again generally along line-of-sight 218; for ease of illustration, the dimension "H" is shown in FIG. 14 as the distance between the measured object and the surface of the lower end 214 of the rod member, however, it will be understood that the measurement will in general be calculated to the vertical centerline rather than the side of the rod. The three-dimensional position of the selected object can be calculated from the values "V", "H" and "A" thus obtained by the tool assembly.

In the embodiment that is illustrated in FIGS. 14-15, the laser distance meter is rotated and lowered/raised by rotating and extending/retracting the rod member 202. It will be understood, however, that in some embodiments these components may be mounted so that they move vertically along and rotate on the rod member while the rod member itself remains stationary and at a fixed length. For example, the laser distance meter may be mounted on an outer ring that is selectively rotated about an inner member by a suitable drive mechanism, for determining the angular position in the horizontal plane, while the inner member is driven vertically along the length of the rod member to obtain the height measurement.

g. Horizontal-Vertical Measurement

The preceding section described use of a laser distance meter (also referred to as a laser range finder) mounted on a vertical rod to obtain a direct measurement of horizontal distance. FIGS. 16-18b, in turn, illustrate an embodiment in which the need for a mechanical rod is dispensed with entirely, with measurements in both the horizontal and vertical planes being accomplished directly by means of a laser range finder.

Figure 16:
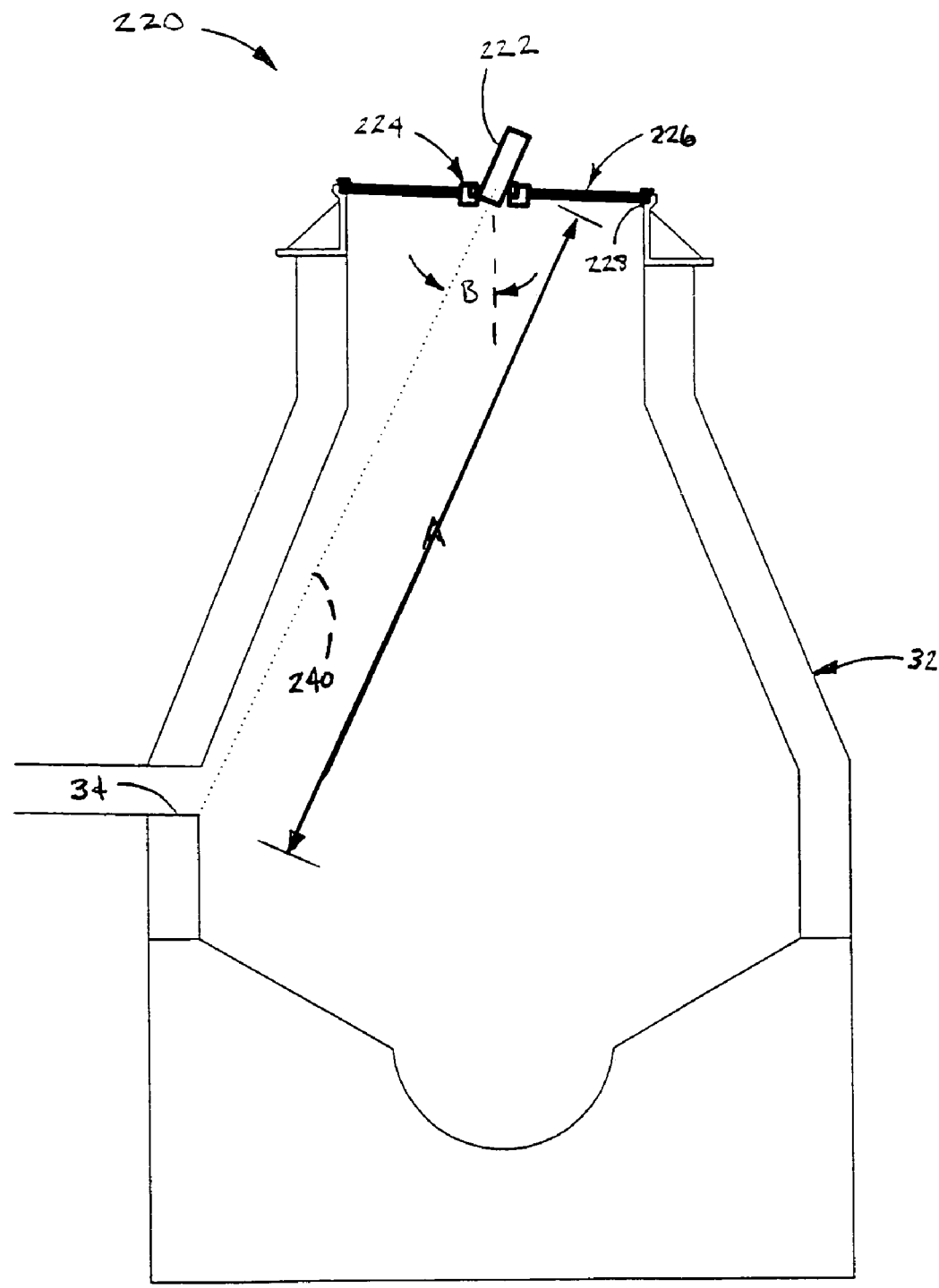
FIG. 16 is an elevational view, similar to FIG. 3, of a measuring apparatus in accordance with another embodiment of the present invention, in which a laser range finder is employed in place of the physical rod member, showing the manner in which the apparatus is installed a manhole for obtaining measurements of pipes of their features or objects therein, the manhole being shown in cross-section.

Accordingly, FIG. 16 shows a measurement apparatus 220 having a laser range finder 222 that performs both measurement functions, and without using the rod member of the embodiment shown in FIG. 3. The ring assembly 224 and legs 226 are essentially similar to those described above, and support the apparatus within the manhole seat 228 in the same manner.

Figure 17:
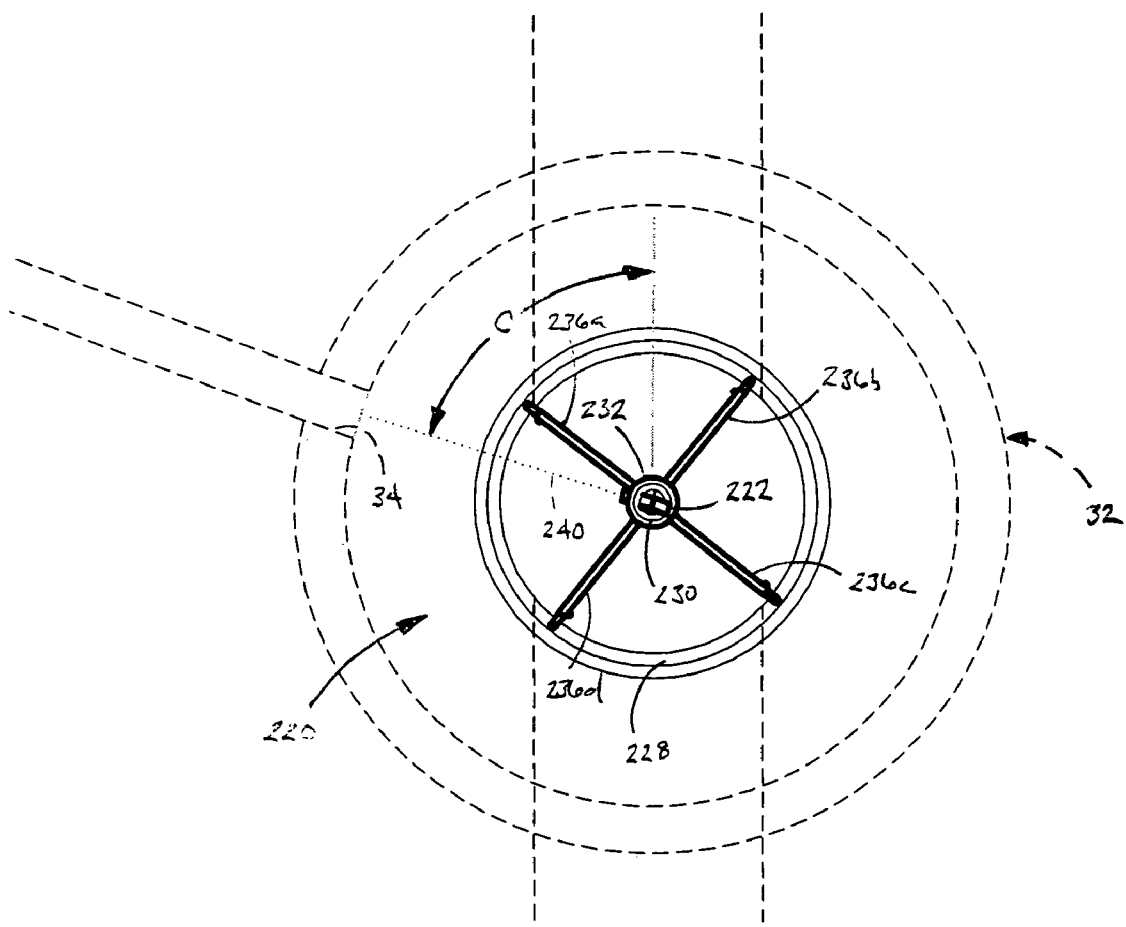
FIG. 17 is a top, plan view, similar to FIG. 4, of the measurement apparatus and manhole of FIG. 16, showing the manner in which the centrally located laser range finder is rotated and pivoted to obtain accurate measurements to points in the manhole.
Figure 18A:
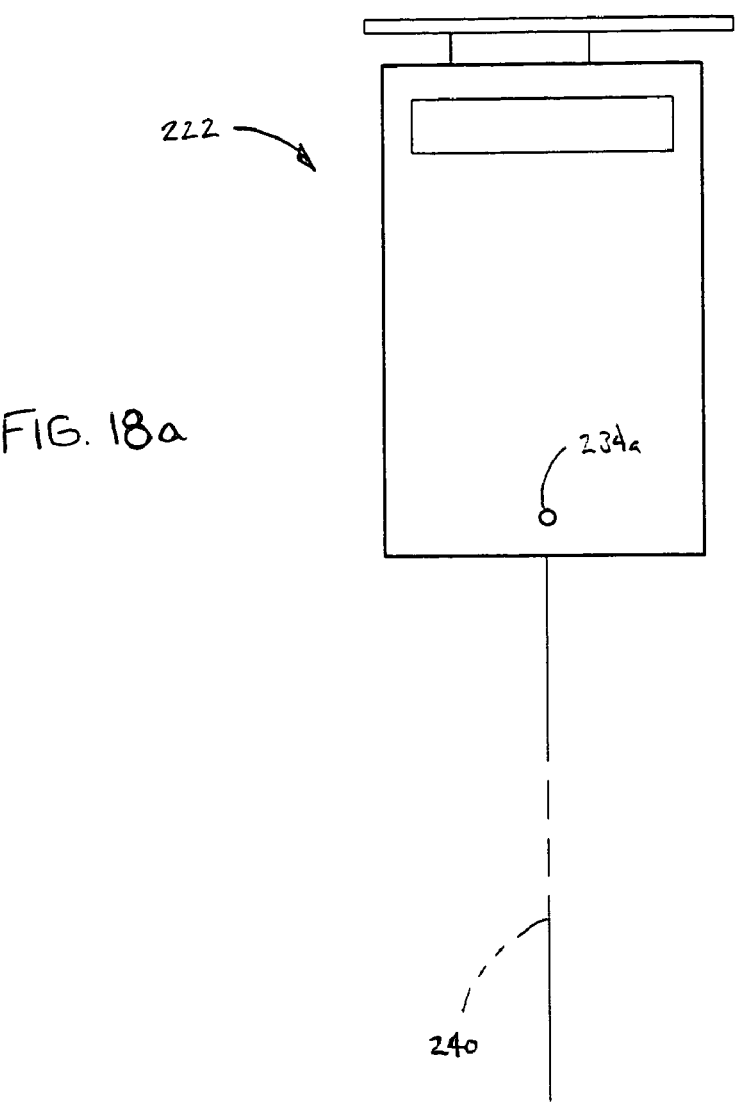
FIGS. 18A-18B are, respectively, elevational and plan views of the laser range finder of the measurement apparatus of FIGS. 16-17.
Figure 18B:
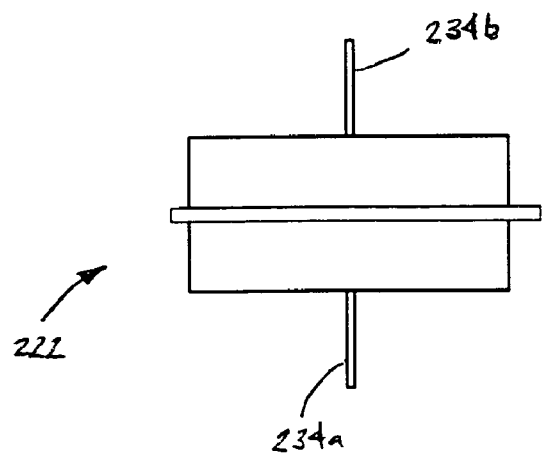

As can be seen in FIG. 17, the bearing assembly 224 includes both inner and outer bearing rings 230, 232 substantially the same as described above, with the laser range finder 222 being similarly supported on laterally extending, horizontal pins 234a, 234b (see FIGS. 18a-18b) for pivoting movement in the vertical plane.

Therefore, in use, the assembly 220 is set within the manhole opening so that the legs 236a-d support the laser range finder 222 and bearing assembly 224 centrally within the opening. The laser range finder is then rotated in the horizontal plane and tilted (pivoted) in the vertical plane, so that its beam 240 is directed at the pipe opening 34 or other feature of interest, as ascertained visually by the operator (e.g., by sighting the illuminated target dot projected by the laser distance meter) viewing through the manhole opening or using a camera. The straight line distance "A" to the opening or other feature is then determined by means of the range finder function of the laser distance meter 222, while the angular measurements "B" and "C" in the vertical and horizontal planes are obtained from the bearing assembly 224 in substantially the same manner as described above.

It will be appreciated that the measurement apparatus 220 operates in substantially the same manner as the rod-based embodiment first described above, with the exception that the distance measurement "A" is obtained by means of the laser range-finding mechanism rather than by physical contact using the rod. Hence, the calculations for determining the three-dimensional location of the pipe or other feature, based on the values "A", "B" and "C", are the same as described above, excepting the offset for the foot of the rod-based embodiment. It will be further understood that other forms of electronic distance measuring devices that obtain distance measurements without direct physical contact with the target object may be used with or in place of the laser distance meter described above.

It is to be recognized that various alterations, modifications, and/or additions may be introduced into the constructions and arrangements of parts described above without departing from the spirit or ambit of the present invention as defined by the appended claims.

What is claimed is:

1. An apparatus for obtaining measurements in a manhole, said apparatus comprising:
   an electronic distance measuring device;
   a frame for supporting said electronic distance measuring device centrally in an access opening of said manhole;
   said electronic distance measuring device being supported in said frame for obtaining a measurement of the distance from said electronic distance measuring device to a selected object in said manhole;
   means operatively connected to said electronic distance measuring device for obtaining a measurement of the angle in a vertical plane from said electronic distance measuring device to said selected object; and
   means operatively connected to said electronic distance measuring device for obtaining a measurement of the angle in a horizontal plane from said electronic distance measuring device to said selected object.

2. The apparatus of claim 1, wherein said electronic distance measuring device comprises:
   a laser distance meter.

3. The apparatus of claim 2, wherein said means operatively connected to said laser distance meter for obtaining a measurement of the angle in a horizontal plane comprises:
   a bearing interconnecting said laser distance meter and said frame so as to permit rotation of said laser distance meter in said horizontal plane; and
   means for determining an angular position of said laser distance meter in said horizontal plane.

4. The apparatus of claim 3, wherein said means operatively connected to said laser distance meter for obtaining a measurement of the angle in a vertical plane comprises:
   a bearing interconnecting said laser distance meter and said frame so as to permit pivoting movement of said laser distance meter in said vertical plane; and
   means for determining an angular position of said laser distance meter in said vertical plane.

5. An apparatus for obtaining measurements in a manhole, said apparatus comprising:
   an electronic distance measuring device;
   a bearing assembly mounted to said electronic distance measuring device so that said electronic distance measuring device is selectively rotatable in a horizontal plane and pivotable in a vertical plane; and
   means for supporting said bearing assembly in an access opening of said manhole so that said electronic distance measuring device is located centrally therein;
   so that said electronic distance measuring device can be rotated and pivoted to selected measurement points within said manhole.

6. The apparatus of claim 5, wherein said electronic distance measuring device comprises:
   a laser distance meter for determining distances to selected measurement points in said manhole.

7. The apparatus of claim 6, further comprising:
   means for determining an angular orientation of said laser distance meter when said laser distance meter is directed at a selected measurement point in said manhole, so that a location of said selected measurement point can be calculated from said angular orientation and said distance determined by said laser distance meter.

8. The apparatus of claim 7, wherein said means for determining an angular orientation of said laser distance meter comprises:
   at least one angle sensor mounted to said bearing assembly and operatively coupled to said laser distance meter so as to determine an angular orientation of said laser distance meter relative to said bearing assembly.

9. The apparatus of claim 8, whereas said at least one angle sensor comprises:
   a first angle sensor operatively coupled to a horizontal axis pivot portion of said bearing assembly for determining an angular orientation of said laser distance meter in a vertical plane; and
   a second angle sensor operatively coupled to a vertical axis pivot portion of said bearing assembly for determining an angular orientation of said laser distance meter in a horizontal plane.

10. The apparatus of claim 6, wherein said bearing assembly comprises:
    an outer support for being supported from said manhole opening;
    an inner support in engagement with said outer support for rotation in a horizontal plane, said inner support having a central opening with said laser distance meter passing generally vertically therethrough; and a horizontal axle supporting said laser distance meter from said inner support for pivoting in a vertical plane.

11. The apparatus of claim 10, further comprising:
a plurality of legs mounted to said outer support for supporting said bearing assembly centrally in said opening of a manhole.

12. The apparatus of claim 11, wherein said inner support comprises an inner ring having said central opening, and said outer support comprises an outer ring having said legs mounted thereto.

13. An apparatus for obtaining measurements in a manhole, said apparatus comprising:
an electronic distance measuring device;
means for supporting said electronic distance measuring device in an access opening of said manhole so that said electronic distance measuring device is selectively rotatable in a horizontal plane and pivotable in a vertical plane so as to be directed towards selected measurement points within said manhole; and
means for recording, when said electronic distance measuring device is diverted towards a selected measurement point, (i) a distance from said electronic distance measuring device to said selected measurement point, (ii) an angular orientation of said electronic distance measuring device in said horizontal plane, and (iii) an angular orientation of said electronic distance measuring device in said vertical plane, so that a location and angular orientation of said measurement point may be calculated therefrom.

14. The apparatus of claim 13, wherein said electronic distance measuring device comprises:
a laser distance meter.

15. A method for obtaining measurements in a manhole, said method comprising the steps of:
mounting a frame in an access opening of said manhole;
supporting an electronic distance measuring device in said frame centrally within said access opening;
obtaining a measurement of the distance from said electronic distance measurement device to a selected object in said manhole;
obtaining a measurement of the angle in a vertical plane from said electronic distance measuring device to said selected object; and
obtaining a measurement of the angle in a horizontal plane from said electronic measuring device to said selected object.

16. The method of claim 15, wherein said electronic distance measuring device is a laser distance meter.

* * * * *